United States Patent [19]
Norcia et al.

[11] Patent Number: 5,158,319
[45] Date of Patent: Oct. 27, 1992

[54] ALL-TERRAIN BABY CARRIAGE

[76] Inventors: Barbara Norcia; James Norcia, both of 132 Cypress Trail, Jensen Beach, Fla. 34957

[21] Appl. No.: 637,457

[22] Filed: Jan. 4, 1991

[51] Int. Cl.⁵ .............................................. B62B 9/00
[52] U.S. Cl. ............................. 280/643; 280/43.17; 280/47.38; 280/650; 280/767
[58] Field of Search ................ 280/47.41, 47.38, 658, 280/650, 647, 642, 643, 648, 767, 43, 43.17, 43.18, 43.19, 43.2, 47.2, 7.1, 28.5, 5.28, 47.331

[56] References Cited

U.S. PATENT DOCUMENTS

| | | | |
|---|---|---|---|
| 66,861 | 7/1867 | Mains | 280/43.17 |
| 298,784 | 5/1884 | Seely | 280/46 |
| 1,322,788 | 11/1919 | Hazelton | 280/43.17 |
| 1,376,649 | 5/1921 | Schneider | 280/28.5 |
| 2,563,919 | 8/1951 | Christensen | 280/43.17 |
| 3,173,396 | 3/1965 | Bradov | 280/47.38 |
| 4,659,142 | 4/1987 | Kuchinsky | 280/41.25 |
| 4,902,027 | 2/1990 | Skelly | 280/62 |

FOREIGN PATENT DOCUMENTS

| | | | |
|---|---|---|---|
| 469149 | 12/1928 | Fed. Rep. of Germany | 280/43 |
| 2223717 | 4/1990 | United Kingdom | 280/47.38 |

*Primary Examiner*—David M. Mitchell
*Attorney, Agent, or Firm*—DeLio & Associates

[57] ABSTRACT

In an all-terrain baby carriage comprising a frame, a seat or cradle for the baby mounted on the frame, two drum-shaped wheels mounted fore and aft, and a swivelling steering wheel assembly mounted on a hinged frame member. The steering wheel assembly may be moved by the hinged frame member between a hard surface configuration wherein the steering wheel assembly is lowered into contact with the hard surface, with the front drum wheel being out of contact with the hard surface, and a soft surface configuration wherein both drum wheels are in contact with the soft surface with the steering wheel assembly being raised out of contact with the soft surface.

10 Claims, 3 Drawing Sheets

ALL-TERRAIN BABY CARRIAGE

BACKGROUND OF THE INVENTION

1. Field of the Invention

This invention relates to baby carriages. More particularly, this invention relates to baby carriages designed for use on hard and smooth surfaces, such as interior floors, sidewalks, roads and similar prepared surfaces, as well as on soft or very rough surfaces, such as sand, gravel, stone, bare dirt and grass.

2. Description of Related Art

Baby carriages, baby buggies, strollers, perambulators, pushchairs and the like are well known devices for transporting a baby or small child. Such devices typically have a set of wheels, a frame, a seat or basket for holding the child, and a handle which permits the carriage to be pushed along by the parent.

Heretofore, baby carriages have almost exclusively been designed with relatively hard narrow wheels. Such wheels reduce the contact area with the type of hard surfaces commonly encountered in the home, in buildings or along streets. For such surfaces, the reduced contact area reduces the rolling friction, making it easier for the parent to push the carriage.

Examples of recently issued patents showing baby carriages with narrow wheels for hard surfaces include those seen in U.S. Pat. No. 4,770,437 issued to Glaser on Sep. 13, 1988; U.S. Pat. No. 4,681,340 issued to Pasquini on Jul. 21, 1987 and U.S. Pat. No. 4,632,420 issued to Miyagi on Dec. 30, 1986. Examples of older designs showing this type of construction are seen in U.S. Pat. No. 606,451 issued to English on Jun. 28, 1898 and U.S. Pat. No. 298,784 issued to Seely on May 20, 1884.

Such designs are excellent for use on surfaces that are both hard and smooth, such as the man-made surfaces typically found in buildings and in cities. However, on soft surfaces such as sand, bare dirt, gravel or grass, a hard narrow wheel has a tendency to dig into the surface making the carriage extremely difficult, if not impossible to push.

A further feature shared by most modern baby carriages is one or more swiveling or castering steering wheels, generally located at the front of the baby carriage. Such steering wheels may also be smaller than the other load-bearing wheels. The swiveling action permits the baby carriage to be easily turned from side to side.

However, small wheels are particularly susceptible to the problem of digging in when being pushed across a soft surface. Moreover, the swiveling action creates even greater difficulties on soft surfaces as the steering wheels tend to oscillate from side to side or turn at an angle to the direction of motion as they are being pushed along, greatly increasing friction. This problem is accentuated by the location of the handle at the rear of the carriage which places a greater load on the front wheels as the carriage is pushed, causing the front wheels to repeatedly dig into the soft surface.

Similar problems are encountered on an extremely rough and uneven surface, even if the surface is hard, such as on rough stone, particularly when the front wheels 1) are small, 2) are swivel mounted, and 3) are heavily loaded with the carriage being pushed from a handle located at the rear of the carriage. On such surfaces the small wheels are difficult to push over the hard irregularities of the surface. The swivel mounting of the wheels permits the wheel to swing out of line from the desired direction due to the irregularities, and the location of the handle at the rear magnifies these problems.

As a result, baby carriages and the like have not heretofore been used on soft or rough surfaces. In circumstances requiring a child to be transported over such surfaces, the child is often carried in the parent's arms or in a front sling or backpack device. These solutions, however, suffer from their own drawbacks, principally that the parent must support the weight of the child at all times and is restricted in motion.

Accordingly, one object of the present invention is to provide a baby carriage suitable for use on soft or rough surfaces. Still another object of the present invention is to provide a baby carriage which may be moved by both pushing and by pulling across a soft surface without the necessity of reversing the baby carriage.

An additional object is to provide such a baby carriage which may be easily maneuvered on hard surfaces. Other objects and advantages of the present invention will be readily apparent to one skilled in the art in view of the disclosure which follows.

SUMMARY OF THE INVENTION

It will be noted that the invention is referred to herein as a "baby carriage", but this term should be understood to encompass devices of all types for carrying infants, babies and young children, regardless of whether they are carried in a chair, a sling or a basket and regardless of whether the child is supported in the seated or reclined position.

In accordance with the invention, the al-terrain baby carriage comprises a frame and a baby holding means, at least two drum wheels and a steering wheel assembly mounted thereon. The frame is configurable to adjust the relative position of the drum wheels and the steering wheel assembly between a hard surface configuration, wherein the steering wheel assembly is in position to contact a hard surface with at least one of the drum wheels being out of contact with the hard surface, and a soft surface configuration, wherein the drum wheels are in position to contact a soft surface with the steering wheel assembly being out of contact with the soft surface.

The drum wheels of the all-terrain baby carriage preferably include a pair of raised portions forming rings on the drum wheel surfaces. The raised rings have a substantially narrower width than the drum wheel such that when the drum wheel is rolling on a hard surface, it contacts that surface principally on the raised ring. When rolling on a soft surface, the raised ring will sink slightly into the surface and the drum wheel surface will make contact to provide flotation and bridge the irregularities of the ground.

The steering wheel assembly is advantageously mounted on a member of the frame intermediate the drum wheels. The intermediate frame member is hinged to swing the steering wheels between an elevated position (to place the frame in the soft surface configuration) and a lowered position (to place the frame in the hard surface configuration). The hinged member of the frame includes a lock mechanism for locking the frame into the hard or soft surface configuration.

The steering wheel assembly preferably includes a pair of steering wheels mounted to swivel about an end of the intermediate hinged frame member. When lowered, the swiveling action of the steering wheels makes the carriage much easier to turn.

The baby carriage may also include one handle at the rear in the conventional configuration for pushing the the baby carriage, and a second handle adapted for pulling the baby carriage. The second handle may be mounted at the front of the carriage and swings to a position out of the way when not being used.

The frame of the baby carriage is hinged and the drum wheels are mounted on the frame such that the carriage may be collapsed for storage.

The invention accordingly comprises the features of construction, combination of elements, and arrangement of parts which will be exemplified in the construction hereinafter set forth, and the scope of the invention will be indicated in the claims.

DETAILED DESCRIPTION OF THE PREFERRED EMBODIMENT

Figure 1:
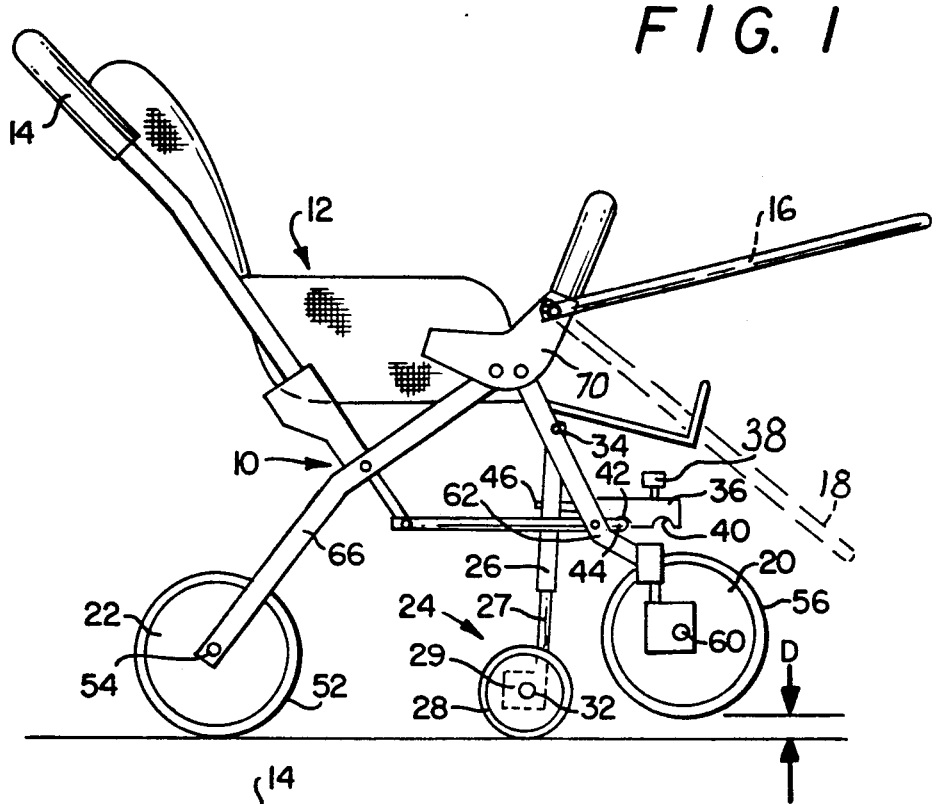
FIG. 1 is a side elevational view of the preferred embodiment of the present invention.

Referring to FIG. 1, it may be seen that the invention comprises a frame, generally indicated with reference numeral 10, a means for holding a baby, generally indicated with reference numeral 12, a rear handle 14 for pushing the baby carriage and a front handle 16 for pulling the baby carriage which may be rotated out of the way into the position 18 shown in phantom.

A front drum-shaped wheel 20 and a rear drum-shaped wheel 22 are mounted on the frame. The drum wheels are particularly suited for use on soft and irregular surfaces due to their large diameter and width.

Between the drum wheels 20, 22 is located a steering wheel assembly, generally indicated by reference numeral 24, which is mounted in swiveling fashion to an intermediate frame member 26.

Figure 2:
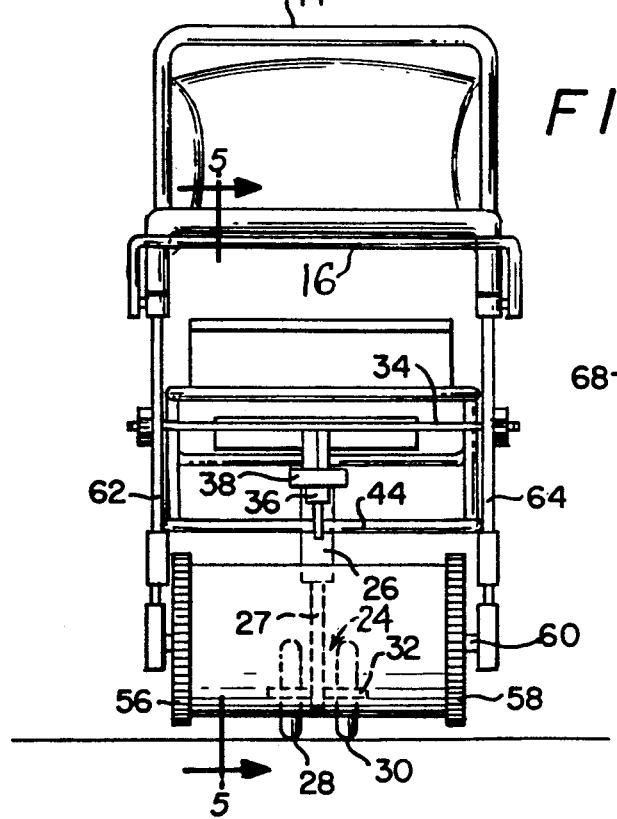
FIG. 2 is a front elevational view of the preferred embodiment.

By referring to FIG. 2, it can be seen that the steering wheel assembly 24 comprises a pair of relatively small diameter steering wheels 28, 30, mounted on an axle 32, which is swivelly connected to the intermediate frame member 26 by means of shaft 27. The axis of swivel is aligned along the longitudinal axis of the intermediate frame member 26 and shaft 27. As a result, the steering wheels can point in any desired direction.

However, as the wheels rotate to a direction other than straight ahead, the angle between the intermediate frame member 26 and the ground, and the relative relation between the position of the axle 32 and the swivel axis, is such that the rotation slightly lowers the steering wheels and thereby elevates the frame. This elevation is resisted by gravity, and provides a natural centering force to gently bring the carriage back to a straight course after it has turned.

Figure 4:
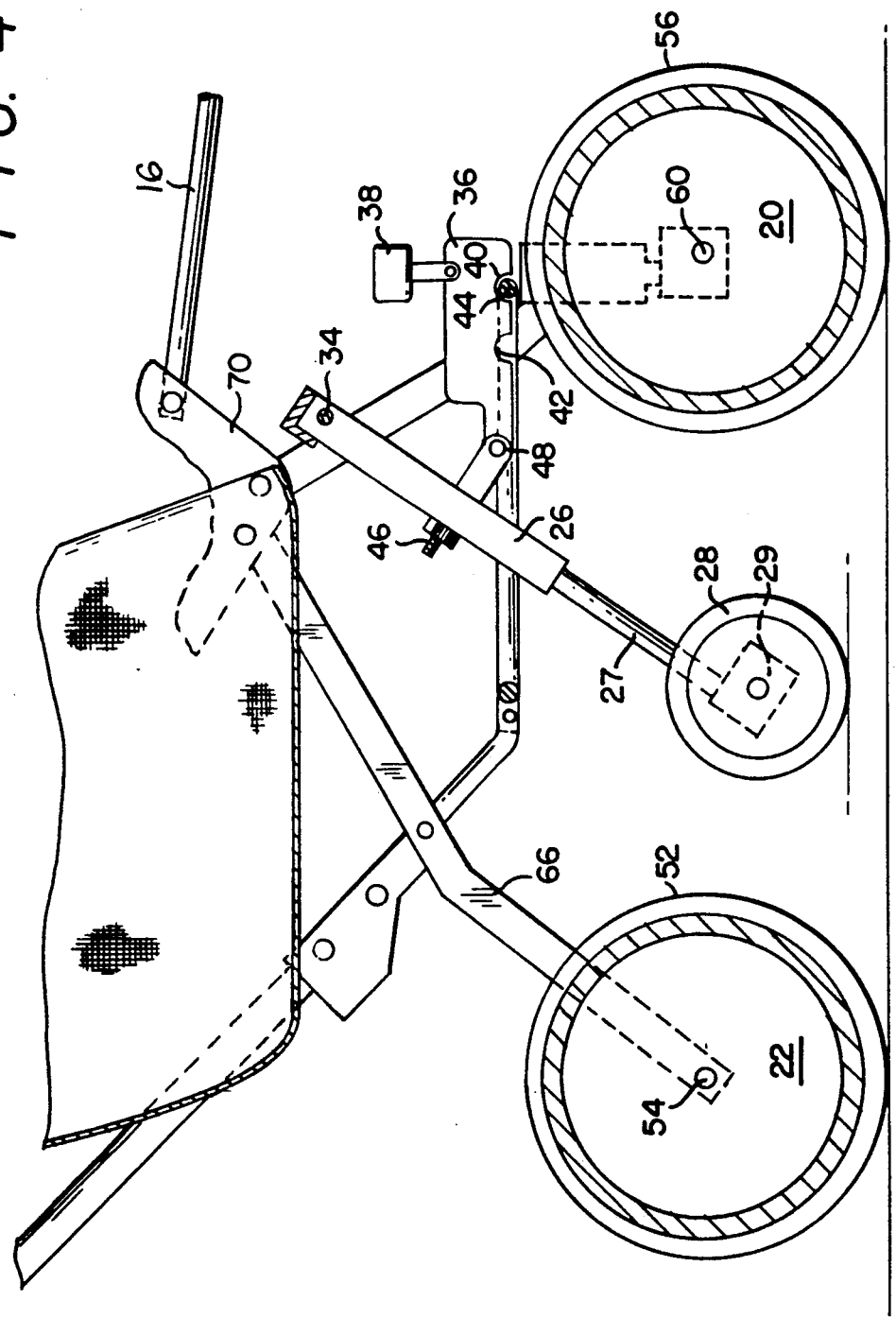
FIG. 4 is a sectional side view of the lower half of the invention along the line 5—5 of FIG. 2, except that the baby carriage is shown in the soft surface configuration.

By referring to FIG. 4, it will be seen that the shaft 27, which forms an extension of the frame member 26, attaches to a bearing block 29 off-center from the axle 32. Because the steering assembly is free to rotate 360 degrees, in the soft surface configuration (as pictured in FIG. 4), the steering assembly rotates to hang the steering wheels down, opposite in direction to the normal running direction in the hard surface configuration (seen in FIG. 5) where the shaft 27 precedes the bearing block 29.

Figure 5:
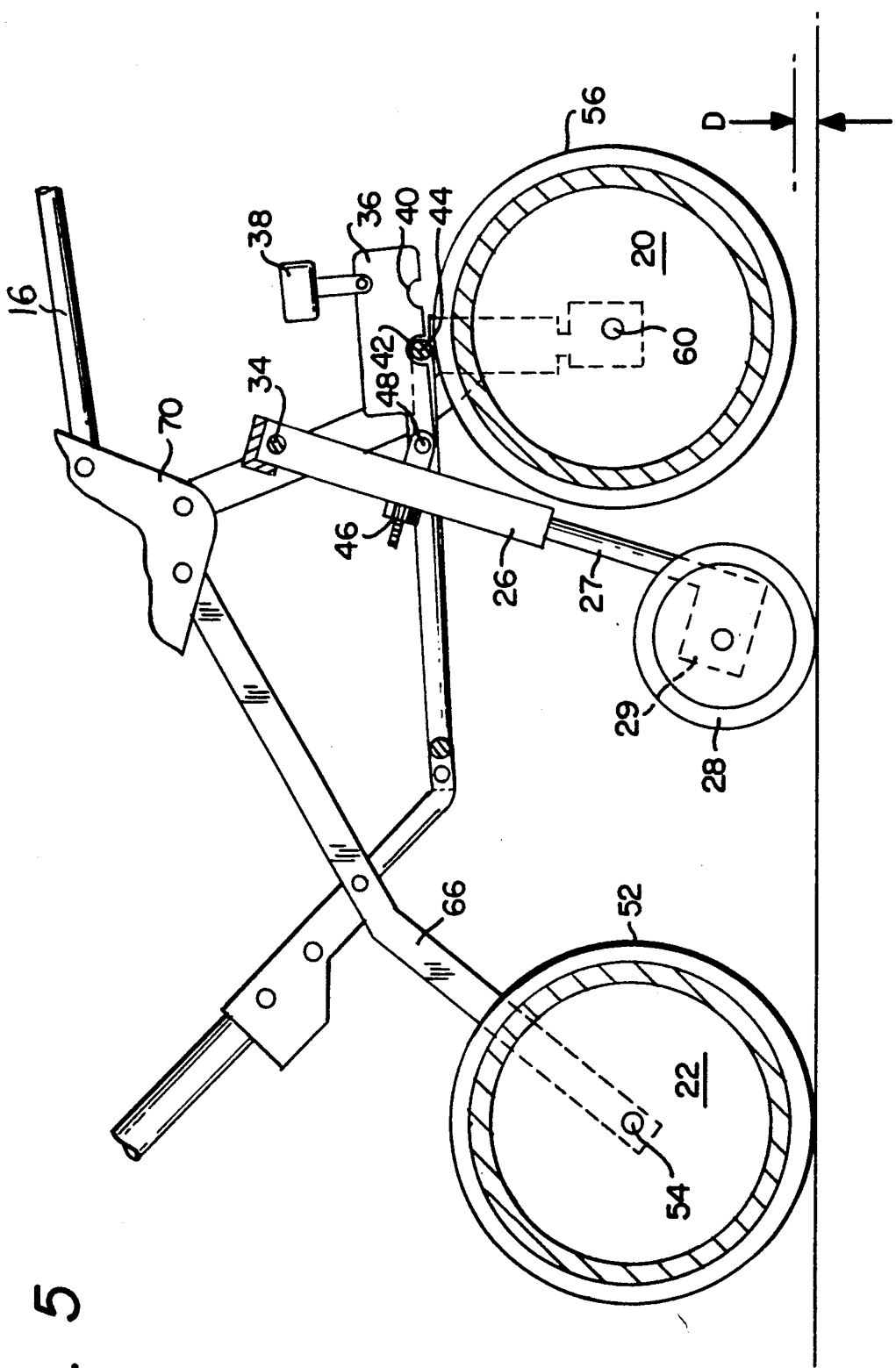
FIG. 5 is a sectional side view of the lower half of the invention along the line 5—5 of FIG. 2, showing the baby carriage in the hard surface configuration.

The intermediate frame member 26 is hingedly attached to the frame at hinge point 34 so as to move the steering wheel assembly 24 in a plane perpendicular to the axis of the drum wheels between an elevated position (wherein the frame is placed in the soft surface configuration - see FIG. 4) and a lowered position (to place the frame in the hard surface configuration—see FIGS. 1, 2 and 5).

Referring to FIG. 2, it can be seen that the hinge member 34 comprises a hinge rod extending between the front frame members 62 and 64.

A lock mechanism 36 is provided to lock the frame into either the hard or soft surface configuration. The lock mechanism 36 is hinged at a hinge point 48 (see FIGS. 4 and 5) so that it may be raised and lowered, and is connected to the intermediate frame member 26 at connection point 46. The lock mechanism includes a handle 38 for lifting and rotating the mechanism about the hinge point 48, and front and rear notches 40, 42. The front and rear notches 40, 42 are sized to match and engage the diameter of a cross frame 44 which extends from the front frame member 62 on the right to the front frame member 64 on the left.

To shift the frame into the hard surface configuration, the handle 38 is lifted (rotating the lock about hinge point 48) and pulled forward, so as to bring the rear notch 42 into alignment with the cross frame member 44. As the lock mechanism is pulled towards the front of the carriage, the intermediate frame member 26, which is connected to the lock mechanism 36 at point 46 is also brought forward, rotating about hinge 34 to bring the steering wheel assembly 24 down from its elevated position and into initial contact with the ground.

As the handle is pulled farther forward to align the notch 42 with the cross frame member 44, the steering wheels 28, 30, which are now in contact with the ground, exert an upward force on the intermediate frame member, thereby lifting the front drum wheel 20 clear of the ground. The lock is then engaged by dropping the rear notch over the cross member 44, thereby locking the frame in the hard surface configuration of FIGS. 1, 2 and 5.

As can be seen in FIGS. 1, 2 and 5, the length of the intermediate frame member 26 is such that when the cross frame member 44 is engaged in the rear notch 42 of the lock assembly, the steering wheel assembly extends below the level of the front drum wheel 20, raising that drum wheel a distance "D" above the ground as indicated in FIGS. 1 and 5.

In this position, the front drum wheel 20 serves no function on hard and smooth surfaces, and the entire weight of the baby carriage and the baby is carried on the rear drum wheel 22 and the front steering wheels 28, 30.

The baby carriage may be pushed in any desired direction and rotated due to the swivelling action of the steering wheel assembly 24.

To shift the frame out of the hard surface configuration and into the soft surface configuration, the handle 38 is lifted, which raises the lock mechanism 36 about pivot point 48 to disengage the rear notch 42 from the cross frame member 44. The front drum wheel 20 is then permitted to drop into contact with the ground as the intermediate frame member 26 hinges back and up about hinge point 34.

As the handle 38 is pushed toward the rear, the intermediate frame member 26 continues to swing back and up, elevating the steering wheel assembly 24 above the ground until the front notch 40 engages the cross frame member 44.

This places the frame in the soft surface configuration as seen in FIG. 4. In this configuration, both the front drum wheel 20 and the rear drum wheel 22 are in contact with the ground. The large diameter of the wheels permits the baby carriage to roll easily over rough and uneven ground, while the width of the drum wheels provides a large contact surface which prevents the baby carriage from sinking into soft ground such as sand, dirt, grass, etc.

On most such surfaces, the baby carriage can be pushed from behind by the rear handle 14, however, it is often easier to pull the baby carriage by means of the front handle 16 by rotating it out of the storage position 18 in FIG. 1. By pulling forwards and up on the second handle, the load on the front drum wheel 20 is reduced, as is the tendency for soft surface materials, such as sand, to build up in front of the carriage wheels.

Figure 3:
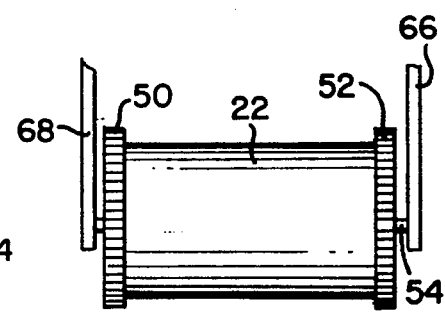
FIG. 3 is a detail view showing a drum wheel with the raised rings.

Referring now to FIGS. 2 and 3, it can be seen that the drum wheel 22 includes two raised portions, 50 and 52 forming a pair of rings on the drum wheel surface. These raised rings 50, 52 have a width which is substantially narrower than the width of the drum wheel, and a diameter which is slightly larger than the drum wheel so that on hard and smooth surfaces, the drum wheel contacts the surface principally along the raised ring 50, 52 whereas on the soft surfaces both the raised ring and the drum wheel contact the ground.

The advantage of the raised rings 50, 52 resides in the reduced contact area and the reduced rolling friction on hard surfaces. As an alternative, the raised rings 50, 52 may be formed as independent wheels, coaxially mounted on the drum wheel shaft 54, on either side of the drum wheel. This configuration improves the turning characteristics of the baby carriage.

The front drum wheel 20 also includes raised rings 56, 58 which may also be formed directly on the surface of the drum surface 20 or which may be separate wheels coaxially mounted on the front axle 60. This permits the baby carriage to be rolled for short distances on the hard surfaces in the soft surface configuration with the advantages of the reduced rolling friction.

In the preferred embodiment, the raised rings 50, 52, 56 and 58 are strips of elastomeric materials glued to the surface of the drum wheels.

The frame 10 of the baby carriage includes a front frame member formed in left and right sides 62, 64. A front axle 60 is connected between them and carries the front drum wheel 20. A rear frame member, including left and right sides 66, 68 has the rear drum wheel 22 mounted between them on rear axle 54. The front and rear frame members are hingedly connected to a pair of left and right hinge members 70. The rear frame members 66, 68 are hingedly connected to the rear handle member 14, and the cross frame member 44 is hinged between the front frame members and the rear handle such that the entire baby carriage, is collapsible for storage.

As the baby carriage collapses, the front drum wheel moves towards the rear drum wheel as the front frame members 62, 64 and rear frame members 66, 68 swing towards each other bout their hinge connections to member 70. Simultaneously, the rear handle 14 moves up towards the vertical position, and the front handle 16 moves down towards the front drum wheel.

As the front handle 16 rotates down and the frame begins to collapse, the cross frame member 44 pivots on its hinge connections to the front frame member thereby allowing the frame to collapse sufficiently to bring the front and rear drum wheels into close proximity with one another and to reduce volume of the baby carriage.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

We claim:

1. An all-terrain baby carriage comprising:
   a collapsible frame including a front frame member hingedly mounted relative to a rear frame member, and an intermediate frame member hingedly mounted on the frame by a hinge means for motion between a raised position and a lowered position to change the frame from a soft surface configuration to a hard surface configuration, the intermediate frame member including a lock mechanism for locking the intermediate frame member in the lowered position;
   a baby holding means mounted on the frame;
   a steering wheel assembly including a steering wheel adapted for rolling across a hard surface, the steering wheel assembly being mounted for swivelling steering motion on the intermediate frame member; and
   at least two cylindrically shaped drum wheels, each wheel having a width that is substantially greater than the width of the steering wheel and substantially greater than is needed for rolling across a hard terrain surface such that the drum wheels are adapted for rolling across an unprepared soft terrain surface when the baby holding means is holding a baby, one drum wheel being mounted on the front frame member and one drum wheel being mounted on the rear frame member;
   the steering wheel projecting at least partly below one drum wheel when the intermediate frame member is lowered to the hard surface configuration whereby the steering wheel will elevate the one drum wheel out of contact with a hard surface, and the front and rear frame members hingedly moving relative to one another to bring the drum wheels into close proximity with one another and reduce the volume of the baby carriage when the frame is collapsed for storage.

2. An all-terrain baby carriage according to claim 1 wherein at least one drum wheel includes a raised portion forming a ring on the drum wheel surface, the raised ring having a substantially narrower width than the width of the drum wheel such that the drum wheel contacts a hard surface principally along the raised ring and contacts a soft surface on both the raised ring and the drum wheel surface.

3. An all-terrain baby carriage according to claim 1 wherein the steering wheel assembly includes a pair of steering wheels mounted to swivel on the intermediate frame member.

4. An all-terrain baby carriage according to claim 1 wherein the intermediate frame member is hingedly attached to the front frame member at an end opposite the steering wheel assembly.

5. An all-terrain baby carriage according to claim 1 wherein the frame further includes a first handle member hingedly connected to the rear frame member for pushing the baby carriage and a cross member connected to the front frame member, the front frame member, the rear frame member, the first handle member and the cross member all being hingedly mounted relative to one another to permit the frame to collapse for storage.

6. An all-terrain baby carriage according to claim 5 wherein the frame further includes a second handle member adapted for pulling the baby carriage.

7. An all-terrain baby carriage according to claim 5 wherein the intermediate frame member is hingedly attached to the front frame member.

8. An all-terrain baby carriage according to claim 7 wherein the drum wheels include raised portions forming a pair of rings on the drum wheel surfaces, the raised rings having a substantially narrower width than the width of the drum wheels such that the drum wheels contact a hard surface principally along the raised rings and contact a soft surface on both the raised rings and the surface of the drum wheels.

9. An all-terrain baby carriage according to claim 8 wherein the frame further includes a second handle member adapted for pulling the baby carriage.

10. An all-terrain baby carriage accordingly to claim 1 wherein the drum wheels have a width which is at least as great as their diameter.

* * * * *